US010046487B2

(12) United States Patent
Nguyen et al.

(10) Patent No.: US 10,046,487 B2
(45) Date of Patent: Aug. 14, 2018

(54) METHODS AND APPARATUS FOR MIXING CHEMICAL COMPONENTS FOR THE MANUFACTURE OF POLYURETHANE

(75) Inventors: Van Chinh Nguyen, Lorong Mydin (SG); Choon Min Hoong, Palm Gardens (SG); Thiam Chye Lee, Rivervale Drive (SG)

(73) Assignee: RIM Polymers Industries PTE., Ltd., Singapore (SG)

( * ) Notice: Subject to any disclaimer, the term of this patent is extended or adjusted under 35 U.S.C. 154(b) by 1224 days.

(21) Appl. No.: 14/437,791

(22) PCT Filed: Jun. 8, 2011

(86) PCT No.: PCT/SG2011/000205
§ 371 (c)(1),
(2), (4) Date: Apr. 22, 2015

(87) PCT Pub. No.: WO2012/169967
PCT Pub. Date: Dec. 13, 2012

(65) Prior Publication Data
US 2015/0336308 A1 Nov. 26, 2015

(51) Int. Cl.
*B29C 44/34* (2006.01)
*B29B 7/80* (2006.01)
(Continued)

(52) U.S. Cl.
CPC ............ *B29C 44/3446* (2013.01); *B29B 7/80* (2013.01); *B01F 15/0222* (2013.01);
(Continued)

(58) Field of Classification Search
CPC ............ B29C 44/3446; B01F 15/0222; B01F 15/0277; B01F 2005/0037; B29B 7/80; B29K 2105/0005; B29K 2105/04
(Continued)

(56) References Cited

U.S. PATENT DOCUMENTS 3,471,131 A   10/1969   Fritzweiler et al.
4,271,298 A   6/1981   Hentschel et al.
(Continued)

FOREIGN PATENT DOCUMENTS

CN   1126134 A   7/1996
CN   1681633 A   10/2005
(Continued)

OTHER PUBLICATIONS

International Search Report of PCT/SG2011/000205, dated May 26, 2015, 7 pages.
(Continued)

*Primary Examiner* — Walter D. Griffin
*Assistant Examiner* — Marc C Howell
(74) *Attorney, Agent, or Firm* — Blank Rome LLP

(57) ABSTRACT

Embodiments of the invention describe methods and apparatus for mixing chemical components in the manufacture of polyurethane foam. The chemical components include a polyol and different blowing agents. The blowing agents are injected directly into a mixing chamber (100) at different height levels according to their boiling points. The mixing chamber allows continuous discharge of the mixture into a static mixer (400) for further mixing before being stored into a storage tank (600). The blowing agents are chemical compounds selected from the group consisting of hydrocarbon-containing compounds, hydrofluorocarbon-containing compounds or hydrofluoroolefin-containing compounds.

15 Claims, 3 Drawing Sheets

(51) Int. Cl.
　　*B29K 105/00*　　(2006.01)
　　*B29K 105/04*　　(2006.01)
　　*B01F 15/02*　　(2006.01)
　　*B29K 75/00*　　(2006.01)

(52) U.S. Cl.
　　CPC .. *B29K 2075/00* (2013.01); *B29K 2105/0005* (2013.01); *B29K 2105/04* (2013.01)

(58) Field of Classification Search
　　USPC .................. 466/76.6; 366/76.6, 177.1, 181.6
　　See application file for complete search history.

(56) References Cited

U.S. PATENT DOCUMENTS

| | | | |
|---|---|---|---|
| 4,314,963 | A | 2/1982 | Boden et al. |
| 4,608,233 | A | 8/1986 | Fiorentini |
| 5,252,625 | A * | 10/1993 | McLaughlin ........ C08G 18/163 521/125 |
| 5,530,035 | A | 6/1996 | Ferrero-Heredia et al. |
| 6,280,692 | B1 * | 8/2001 | Bartlett, Jr. ......... B29C 44/3442 422/110 |
| 6,359,022 | B1 | 3/2002 | Hickey et al. |
| 2004/0048941 | A1 | 3/2004 | Raffel et al. |
| 2010/0049370 | A1 * | 2/2010 | Raber ...................... A23G 9/28 700/285 |
| 2010/0215935 | A1 * | 8/2010 | Fabian Mariezkurrena ............................... B29C 44/24 428/220 |

FOREIGN PATENT DOCUMENTS

| | | |
|---|---|---|
| DE | 102005052343 B3 | 6/2007 |
| DE | 102007014768 | 10/2008 |
| EP | 0108167 | 5/1984 |
| EP | 0418585 A1 | 3/1991 |
| EP | 1847367 A2 | 10/2007 |
| EP | 2090353 A1 | 8/2009 |
| GB | 1206886 | 9/1970 |
| GB | 1206886 A * | 9/1970 ............ C12M 27/04 |
| WO | WO-96/12758 | 5/1996 |

OTHER PUBLICATIONS

Search and Examination Report of Singapore Application No. 2012071346, dated Aug. 22, 2014, 4 pages.

Chinese Office Action of Chinese Application No. 201180020888, dated May 26, 2015, 8 pages.

* cited by examiner

METHODS AND APPARATUS FOR MIXING CHEMICAL COMPONENTS FOR THE MANUFACTURE OF POLYURETHANE

RELATED APPLICATION

This application is a national phase of PCT/SG2011/000205, filed Jun. 8, 2011, the entire contents of which is incorporated herein by reference.

TECHNICAL FIELD

Embodiments of the invention relate to an apparatus and methods for mixing chemical components, in particularly a polyol and blowing agents, for the fabrication of polyurethane foam.

BACKGROUND

Polyurethane foams are widely used in thermal insulation applications, such as refrigerators, insulation for outdoor panels, and various parts of automobiles. The manufacture of polyurethane foam typically involves the mixing of chemical components, such as a polyol and an isocyanate, with the addition of blowing agent and other additives.

One common manufacturing method is to blend the blowing agent with a polyol compound first before allowing the mixture to react with an isocyanate to create polyurethane foam. Chlorofluorocarbons (CFCs), for example Freon 11 and Freon 12, were extensively used by the industry in the past decade as the primary blowing agent. They are considered as the $1^{st}$ generation blowing agents and have been phased out under the UN Montreal Protocol due to their high Ozone Depletion Potential (ODP) value. Hydrochlorofluorocarbons (HCFCs), such as HCFC 141b, which are considered as the $2^{nd}$ generation blowing agents are also scheduled to be phased out under the Montreal Protocol as its ODP value is not zero.

The $3^{rd}$ generation of blowing agents to replace CFCs and HCFCs include compounds such as Hydrofluorocarbons (HFCs) (e.g. HFC-245fa, 365mfc, 134a), Hydrocarbons (e.g. cyclopentane), and Hydrofluoroolefins (HFO) (e.g. HFO-1234ZE). These blowing agents are mainly used in the manufacture of rigid polyurethane foam for insulation applications. The HFCs compounds are currently accepted by the industry as alternatives to CFCs and HCFCs but they are not direct replacements and the chemical formulations and mixing systems have to be adapted in order to achieve the required polyurethane foam properties.

SUMMARY

According to one embodiment of the invention, a mixing apparatus for the manufacture of polyurethane foam comprises a mixing chamber having a plurality of nozzles to inject a polyol and blowing agents into the chamber. The nozzles are located at different sections (e.g. height) of the mixing chamber, and the different blowing agents are injected into mixing chamber according to their boiling points. The blowing agents are selected chemical compounds having a Ozone Depletion Potential (ODP) with low or zero value and/or a Global Warming Potential (GWP) of less than 1500.

According to another embodiment of the invention, the mixing apparatus comprises a static mixer for additional mixing of the mixture composition discharged from the mixing chamber. The further mixing by the static mixer improves the homogeneity of the mixture composition to provide a higher quality product.

BRIEF DESCRIPTION OF THE DRAWINGS

Embodiments of the invention will be readily understood by the following detailed description in conjunction with the accompanying drawings.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. In other instances, well known polyurethane processing methods and devices have not been described in detail in order not to necessarily obscure pertinent aspects of embodiments being described.

In an embodiment of the invention, a mixing apparatus for the manufacture of polyurethane foam comprises a mixing chamber having a plurality of nozzles for injecting a polyol and blowing agents into the chamber. In a particular embodiment, the plurality of nozzles are positioned at different height levels on the mixing chamber and the blowing agents are injected via the nozzles according to their boiling points. The blowing agents are chemical compounds selected from the group consisting of hydrocarbon-containing compounds, hydrofluorocarbon-containing compounds or hydrofluoroolefin-containing compounds. Furthermore, the blowing agents have zero Ozone Depletion Potential (ODP) and/or a low Global Warming Potential (GWP) of less than 1500. The ODP of a substance is defined as the ratio of impact on the ozone due the substance relative to CFC-11 of a similar mass, where the ODP of CFC-11 is defined as 1.0. The GWP of a substance is defined as the ratio of warming caused by the substance relative to carbon dioxide of a similar mass, where the GWP of $CO_2$ is defined as 1.0. In one embodiment, the mixture from the mixing chamber is delivered to a static mixer to improve the homogeneity of the mixture composition.

Figure 1:
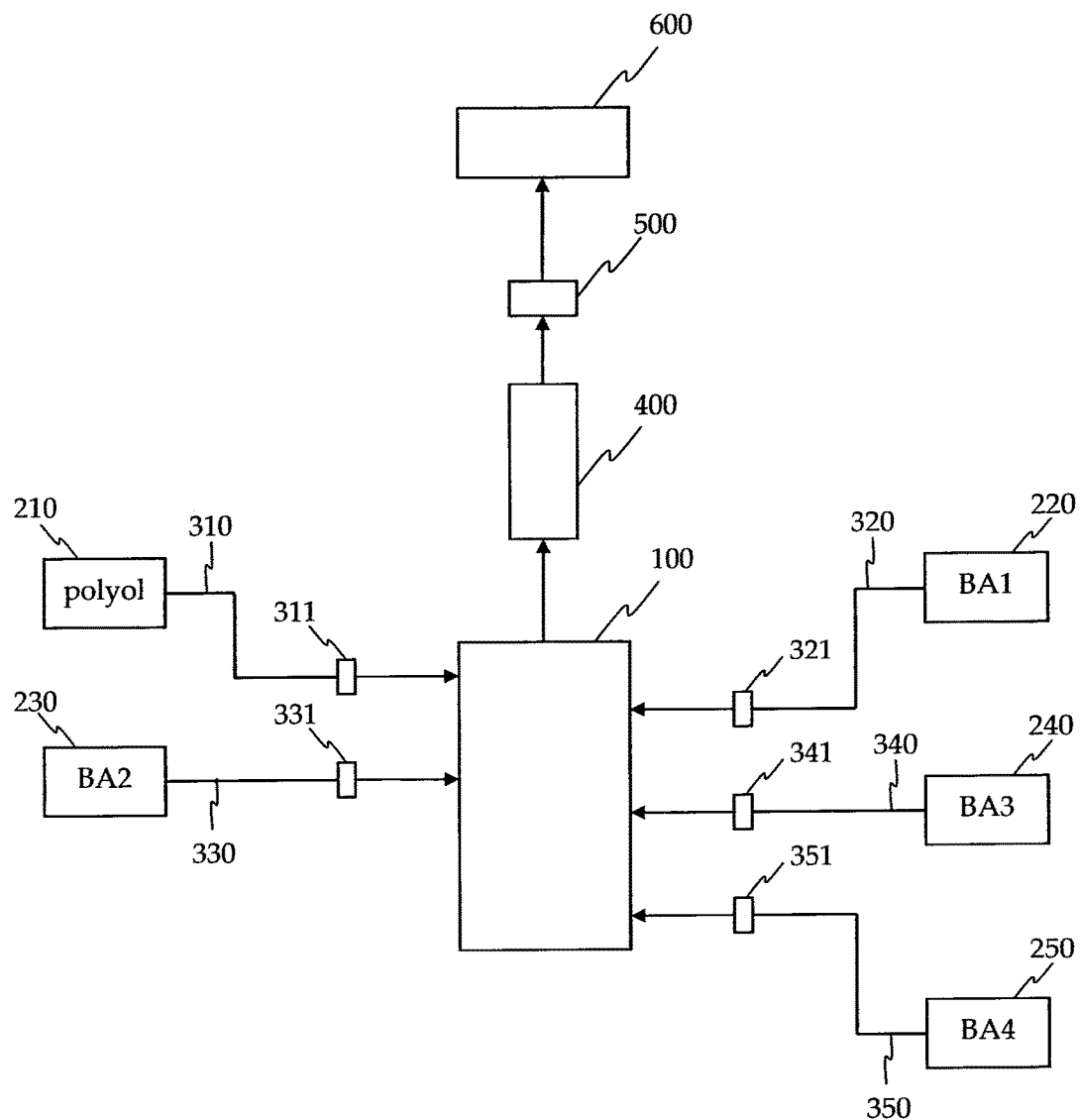
FIG. 1 illustrates a block diagram of a mixing apparatus for the manufacture of polyurethane foam in accordance with one embodiment of the invention.

FIG. 1 illustrates a block diagram of a mixing apparatus for the manufacture of polyurethane. In one embodiment, the mixing apparatus comprises a plurality of container modules 210, 220, 230, 240, 250 that deliver chemical components to a mixing chamber 100 for impingement mixing. Impingement mixing refers to a method of mixing chemical components, where streams of those components are forced towards each other at high velocities, and the resulting high kinetic energy of the streams is used for mixing. In an embodiment of the invention, the chemical components include at least a polyol and four blowing agents BA1, BA2, BA3, BA4.

FIGS. 2 to 5 illustrate the side views and cross-sectional views of the mixing chamber 100. In an embodiment of the invention, the mixing chamber 100 comprises a plurality of nozzles 110, 120, 130, 140, 150 to allow the polyol and the four different blowing agents BA1, BA2, BA3, BA4 to be injected into the mixing chamber 100. In one embodiment, the mixing chamber 100 has a cylindrical shape. The mixing chamber 100 can be made from materials such as metal or metal alloys.

In one embodiment, the first nozzle 110 (FIG. 2) allows the polyol to be injected into the mixing chamber 100, wherein the polyol have a boiling point of around 200 to 250 degrees Celsius (° C.). For example, the polyol can be a polyether polyol, such as but not limited to polypropylene glycol (PPG).

A second nozzle 120 is positioned on the mixing chamber 100 at a lower height level than the first nozzle 110 (FIG. 2), wherein the second nozzle 120 allows a first blowing agent BA1 to be injected into the mixing chamber 100. In one embodiment, the first blowing agent BA1 is a hydrocarbon-containing compound having a boiling point of around 40 to 60 degrees Celsius (° C.). For example, the first blowing agent BA1 can be cyclopentane ($C_5H_{10}$).

A third nozzle 130 is positioned on the mixing chamber 100 at a lower height level than the second nozzle 120, wherein the third nozzle 130 allows a second blowing agent BA2 to be injected into the mixing chamber 100. In one embodiment, the second blowing agent BA2 is a hydrofluorocarbon-containing compound having a boiling point of around 20 to 40 degrees Celsius. For example, the second blowing agent BA2 can be HFC 365mfc ($CF_3CH_2CF_2CH_3$), or 365mfc/227ea (i.e. a mixture of 365mfc and 227ea).

A fourth nozzle 140 is positioned on the mixing chamber 100 at a lower height level than the third nozzle 130 (FIG. 3), wherein the fourth nozzle 140 allows a third blowing agent BA3 to be injected into the mixing chamber 100. In one embodiment, the third blowing agent BA3 is a hydrofluorocarbon-containing compound having a boiling point of around 0 to 20 degrees Celsius. For example, the third blowing agent BA3 can be HFC 245fa ($CF_3CH_2CHF_2$).

A fifth nozzle 150 is positioned at a lower height level than the fourth nozzle 140, wherein the fifth nozzle 150 allows a fourth blowing agent BA4 to be injected into the mixing chamber 100. In one embodiment, the fourth blowing agent BA4 is a hydrocarbon-containing compound, hydrofluorocarbon-containing compound or hydrofluoroolefin-containing compound having a boiling point of around −30 to 0 degrees Celsius. For example, the fourth blowing agent BA4 can be R600a ($C_4H_{10}$), HFC 134a ($CH_2F-CF_3$), HFC 227ea ($C_3HF_2$) or HFO 1234ZE (trans-CHF=CHCF$_3$).

Figure 2:
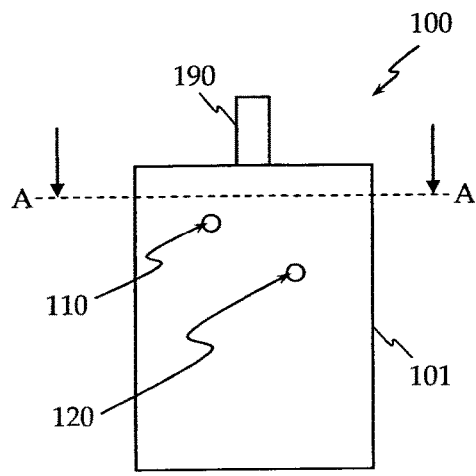
FIG. 2 illustrates a side view of the mixing chamber in accordance with one embodiment of the invention.
Figure 3:
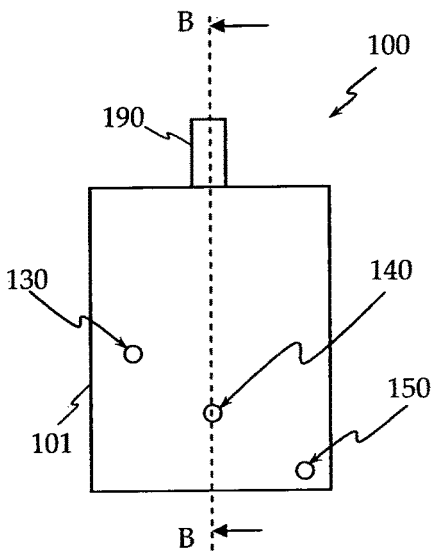
FIG. 3 illustrates an alternative side view of the mixing chamber of FIG. 2.
Figure 4:
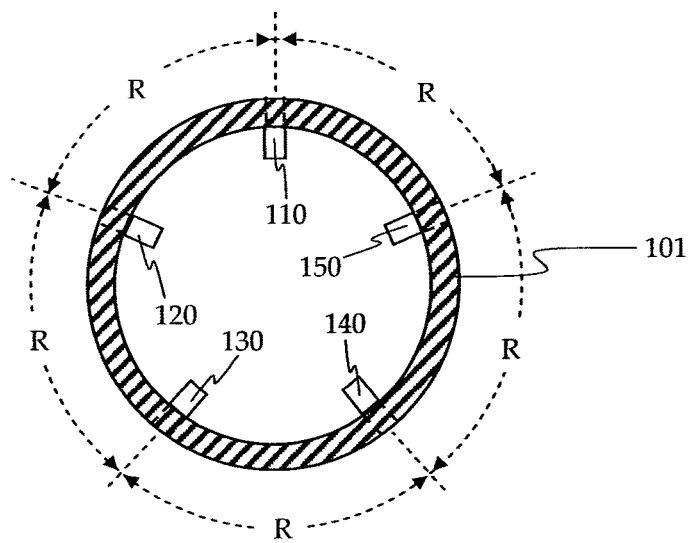
FIG. 4 illustrates a cross-sectional view of the mixing chamber taken along the line A-A of FIG. 2.

In one embodiment, the plurality of nozzles 110, 120, 130, 140, 150 are positioned at different heights of the sidewall 101 of the mixing chamber 100 as shown in FIGS. 2 and 3. In one embodiment, the plurality of nozzles 110, 120, 130, 140, 150 are positioned in a substantially radial equidistant R from each other (FIG. 4).

Figure 5:
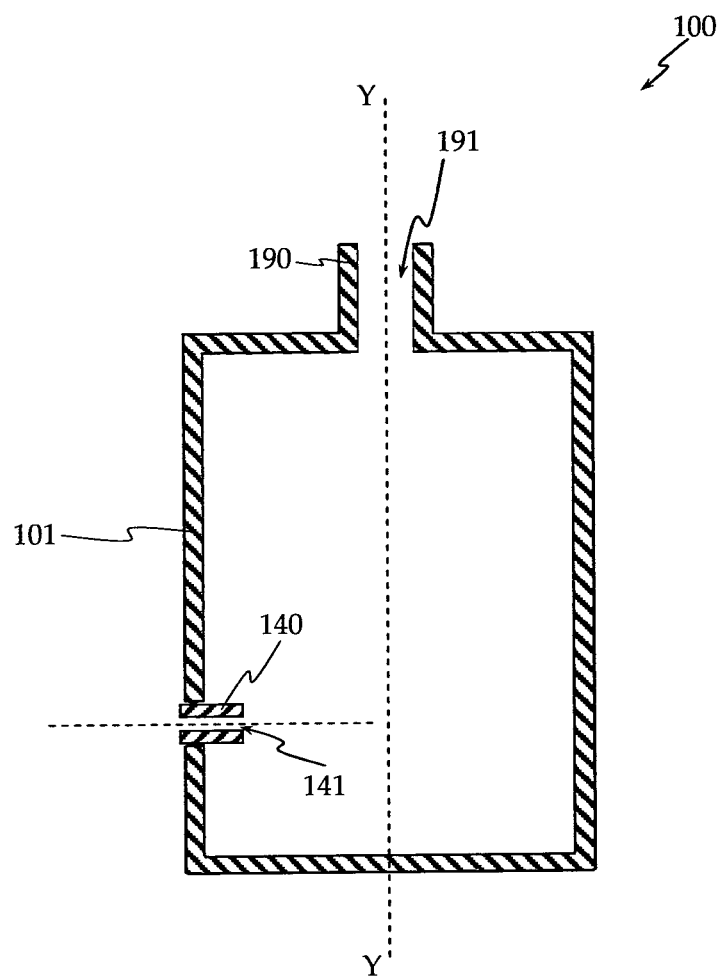
FIG. 5 illustrates a cross-sectional view of the mixing chamber taken along the line B-B of FIG. 3.

Referring to FIG. 5, the fourth nozzle 140 includes an orifice 141 for injecting the third blowing agent BA3 into the mixing chamber. Similarly, the other nozzles 110, 120, 130 and 150 each have an orifice for injection of the respective chemical compounds. It can be appreciated that the orifice of the nozzles 110, 120, 130, 140, 150 can be designed with different diameters to facilitate the injection of the different types of chemical compounds (i.e. the polyol and blowing agents). In one embodiment, the nozzles 110, 120, 130, 140, 150 are inserted through pre-formed holes in the sidewall 101 of the chamber 100 and secured in place by adhesive, sealants or O-rings. In one embodiment, the nozzles 110, 120, 130, 140, 150 axes are directed towards the vertical centre axis Y-Y of the mixing chamber 100. In one specific embodiment, the nozzle 110, 120, 130, 140, 150 axes are substantially perpendicular to the vertical centre axis Y-Y.

The mixing chamber 100 includes an outlet 190 having a channel 191 that allows the discharge of the mixture of polyol and the blowing agents resulted from the impingement reaction/mixing. In one embodiment, the outlet 190 is positioned at the top of the mixing chamber 100. In an embodiment of the invention, the mixture is discharged by high pressure continuously without the use of any control valves.

Before injection into the mixing chamber 100, the polyol and blowing agents BA1, BA2, BA3, BA4 are stored separately in the plurality of container modules 210, 220, 230, 240, 250 (FIG. 1). In one embodiment, the container modules 210, 220, 230, 240, 250 maintain the polyol and blowing agents BA1, BA2, BA3, BA4 at the desired temperature and pressure before releasing them to the mixing chamber 100. The temperature of each polyol and blowing agents BA1, BA2, BA3, BA4 can be adjusted according to the mixing process requirements. In an embodiment of the invention, the container modules 210, 220, 230, 240, 250 uses well known temperature or pressure control mechanisms to maintain the polyol and blowing agents in their liquid phase to facilitate the impingement mixing, particularly for the fourth blowing agent BA4 such as HFC 134a which has a low boiling point of around −26° C. and high vapor pressure.

The container modules 210, 220, 230, 240, 250 are coupled to the mixing chamber 100 by respective pipes 310, 320, 330, 340, 350 and metering pumps 311, 321, 331, 341, 351 for delivering the polyol and blowing agents BA1, BA2, BA3, BA4 to the mixing chamber 100. The pipes 310, 320, 330, 340, 350 are coupled to the plurality of nozzles 110, 120, 130, 140, 150 respectively. The input pressure and volume of the polyol and each blowing agent BA1, BA2, BA3, BA4 injected into the mixing chamber 100 are controlled by the respective metering pumps 311, 321, 331, 341, 351. The metering pumps 311, 321, 331, 341, 351 deliver the polyol and blowing agents BA1, BA2, BA3, BA4 in the desired ratio from the container modules 210, 220, 230, 240, 250 to the mixing chamber 100. Furthermore, the metering pumps 311, 321, 331, 341, 351 ensure that the proper ratio is reproducible and accurate to achieve a consistent high quality mixture. The metering pumps 311, 321, 331, 341, 351 are coupled to switch valves (not shown) that turn on or off the flow of polyol and the blowing agents BA1, BA2, BA3, BA4 into the mixing chamber 100.

In one embodiment, the metering pump 311 uses an axial piston pump with maximum pressure of around 250 BAR for metering the polyol. In one embodiment, the metering pumps 321, 331, 341, 351 uses well known piston pumps or cylinder pump with maximum pressure of around 140 BAR for metering the blowing agents.

In an embodiment of the invention, the polyol and blowing agents BA1, BA2, BA3, BA4 are fed through the pipes 310, 320, 330, 340, 350 at temperatures and pressures sufficient for maintaining the polyol and blowing agents BA1, BA2, BA3, BA4 in a liquid phase. In one embodiment, flow meters and temperature sensors (not shown) are coupled to the pipes 310, 320, 330, 340, 350 to monitor the flow-rate and temperature of the polyol and blowing agents BA1, BA2, BA3, BA4. The flow meter and temperature sensors are components of a closed-loop system that monitors and adjusts the input pressure, volume and temperature of the polyol and blowing agents BA1, BA2, BA3, BA4 to ensure consistency in the mixing process. In other words, the closed-loop system enables precise control on the flow, pressure and temperature according to the characteristics of the polyol and blowing agents BA1, BA2, BA3, BA4 to achieve good quality mixture.

In an embodiment of the invention, a static mixer 400 is coupled to the outlet 190 of the mixing chamber 100. The static mixer 400 serves as an additional mixing means to improve the homogeneity of the discharged mixture. The static mixer uses well known device that comprises a series of helical elements enclosed in tubular housing.

In one embodiment, a pressure control module 500 is coupled to the outlet of the static mixer 400. The pressure control module 500 comprises a pressure regulator to control the flow of mixture discharged from the static mixer 400 to the storage tank 600. In addition, the pressure control module 500 may include a pressure gauge to measure the pressure of the mixture discharged from the static mixer 400. The storage tank 600 stores the mixture until subsequent mixing with isocyanate to form polyurethane foam.

The method for mixing the polyol and blowing agents BA1, BA2, BA3, BA4 is now described. The polyol and blowing agents BA1, BA2, BA3, BA4 are first stored separately in the container modules 210, 220, 230, 240, 250. In one embodiment, the polyol and blowing agents BA1, BA2, BA3, BA4 are maintained in their liquid phase in the container modules 210, 220, 230, 240, 250.

Next, the polyol and blowing agents BA1, BA2, BA3, BA4 are delivered from the container modules 210, 220, 230, 240, 250 to the mixing chamber 100 by the respective pipes 310, 320, 330, 340, 350 and metering pumps 311, 321, 331, 341, 351. In the mixing chamber 100, a portion of each injected stream of polyol and blowing agent BA1, BA2, BA3, BA4 mixes with the other to form a mixture. In one embodiment, the metering pumps 311, 321, 331, 341, 351 control the input pressure and volume so that liquid streams of polyol and blowing agents BA1, BA2, BA3, BA4 are injected into the mixing chamber 100 via the respective nozzles 110, 120, 130, 140, 150 for impingement mixing. In one embodiment, the minimum flow rate of the polyol is around 200 gram/second (g/s) and for the blowing agents BA1, BA2, BA3, BA4 is around 2 gram/second (g/s). In one embodiment, the mixing ratio is around 1~15 parts of each of the blowing agents BA1/BA2/BA3/BA4 to 100 parts of the polyol. In this case, the mixing ratio of the combination of the four blowing agents BA1, BA2, BA3 and BA4 is around 13-35 parts to 100 parts of polyol.

In other embodiments, manufacturers can fabricate polyurethane foam with different insulation properties by using different combinations of the blowing agents. For example, only three blowing agents BA1, BA2 and BA3 are mixed with polyol. In this case, the mixing ratio of each of the blowing agents BA1/BA2/BA3 is around 1~15 parts to 100 parts of polyol. The ratio of the combined blowing agents BA1, BA2, and BA3 is around 13-35 parts to 100 parts of polyol.

In one embodiment, the polyol and blowing agents BA1, BA2, BA3, BA4 are simultaneously injected into the mixing chamber 100. In other words, the polyol and blowing agents BA1, BA2, BA3, BA4 are injected into the mixing chamber 100 at substantially the same time. In one embodiment, the polyol and blowing agents BA1, BA2, BA3, BA4 are continuously injected into the mixing chamber 100, which allows the mixing apparatus to produce high output of the mixture at each cycle.

After impingement mixing in the mixing chamber 100, the resulting mixture is discharged from the channel 191 of the mixing chamber 100. In one embodiment, the discharged mixture is delivered to the static mixer 400 for further mixing to improve the homogeneity of its composition. Then, the mixture is delivered from the static mixer 400 to a storage tank 600. Subsequently, the mixture stored in the storage tank 600 is mixed with isocyanate to form polyurethane foam.

As apparent from the above description and appended drawings, embodiments of the invention provide a mixing apparatus and methods that provide good mixture quality using chemical components (i.e. polyol and blowing agents) of different characteristics. Some of the blowing agents with boiling points below room temperature have to be maintained in liquid phase in order to facilitate impingement mixing. The mixing apparatus is able to handle any combinations and vast difference in mixing ratio of various chemical components. It also provides stability and consistency in controlling the mixing process and parameters (e.g. input pressure and volume). Manufacturers are able to benefit from the advantages of mixing not just one but different blowing agents.

Furthermore, the mixing apparatus and methods provide manufacturers with the flexibility to develop their own mixing formulations, and enjoy the benefits of various chemical components in the final mixtures. For example, manufacturers can use less quantity of high volatile blowing agents, such as cyclopentane or HFC 365mfc, in their formulations, which helps to reduce the safety risk of using the polyurethane and yet fulfill the zero ODP requirements. In addition, manufacturers are able to benefit from the combination of various blowing agents and achieve good insulation properties of the polyurethane foam. They can explore various combinations to reduce the overall operation costs.

Several embodiments of the invention have thus been described. However, those ordinarily skilled in the art will recognize that the invention is not limited to the embodiments described, but can be practiced with modification and alteration within the spirit and scope of the appended claims that follow.

What is claimed is:

1. A mixing apparatus for the manufacture of polyurethane foam, the mixing apparatus comprising:
an impingement mixing chamber including
a first nozzle;
a polyol injected via the first nozzle into the mixing chamber, wherein the polyol has a boiling point of about 200 to 250 degrees Celsius;
a second nozzle positioned at a lower height level than the first nozzle;
a first blowing agent injected via the second nozzle into the mixing chamber, wherein the first blowing agent is a hydrocarbon-containing compound having a boiling point of about 40 to 60 degrees Celsius;
a third nozzle positioned at a lower height level than the second nozzle;
a second blowing agent injected via the third nozzle into the mixing chamber, wherein the second blowing agent is a hydrofluorocarbon-containing compound having a boiling point of about 20 to 40 degrees Celsius;
a fourth nozzle positioned at a lower height level than the third nozzle;
a third blowing agent injected via the fourth nozzle into the mixing chamber, wherein the third blowing agent is a hydrofluorocarbon-containing compound having a boiling point of about 0 to 20 degrees Celsius;

a fifth nozzle positioned at a lower height level than the fourth nozzle;

a fourth blowing agent injected via the fifth nozzle into the mixing chamber; wherein the fourth blowing agent is a hydrocarbon-containing compound, hydrofluorocarbon-containing compound or hydrofluoroolefin-containing compound having a boiling point of about −30 to 0 degrees Celsius; and an outlet at the top of the mixing chamber, wherein the injected polyol and the first, the second, the third, and the fourth blowing agents react to form a mixture that is discharged through the outlet, wherein the first, the second, the third, the fourth and the fifth nozzles are positioned at the sidewall of the mixing chamber and at different positions along a circumferential direction defined by the sidewall.

2. The mixing apparatus of claim 1, wherein the first, the second, the third, the fourth and the fifth nozzles are positioned substantially radially equidistant from each other.

3. The mixing apparatus of claim 1, wherein the first, the second, the third, the fourth and the fifth nozzles axes are directed towards the centre axis of the mixing chamber.

4. The mixing apparatus of claim 1 further comprising: a static mixer coupled to the outlet of the mixing chamber, wherein the static mixer allows additional mixing of the mixture discharged from the mixing chamber.

5. The mixing apparatus of claim 4 further comprising: a storage tank coupled to the static mixer to store the mixture discharged from the static mixer.

6. The mixing apparatus of claim 1 further comprising: a plurality of container modules coupled to the mixing chamber, wherein the plurality of container modules maintain the polyol and the first, the second, the third, and the fourth blowing agents in a liquid phase.

7. A method of mixing for the manufacture of polyurethane foam, the method comprising:

injecting a stream of polyol having a boiling point of about 200 to 250 degrees Celsius into a mixing chamber via a first nozzle;

injecting a stream of first blowing agent into the mixing chamber via a second nozzle positioned at a lower height level than the first nozzle, wherein the first blowing agent is a hydrocarbon-containing compound having a boiling point of about 40 to 60 degrees Celsius;

injecting a stream of second blowing agent into the mixing chamber via a third nozzle positioned at a lower height level than the second nozzle, wherein the second blowing agent is a hydrofluorocarbon-containing compound having a boiling point of about 20 to 40 degrees Celsius;

injecting a stream of third blowing agent into the mixing chamber via a fourth nozzle positioned at a lower height than the third nozzle, wherein the third blowing agent is a hydrofluorocarbon-containing compound having a boiling point of about 0 to 20 degrees Celsius;

injecting a stream of fourth blowing agent into the mixing chamber via a fifth nozzle positioned at a lower height level than the fourth nozzle, wherein the fourth blowing agent is a hydrocarbon-containing compound, hydrofluorocarbon-containing compound or hydrofluoroolefin-containing compound having a boiling point of about −30 to 0 degrees Celsius, wherein a portion of each stream of polyol and the first, the second, the third, and the fourth blowing agent mixes with the other to form a mixture; and discharging the mixture from the mixing chamber.

8. The method of claim 7, wherein the polyol and the first, the second, the third, and the fourth blowing agents are injected into the mixing chamber at substantially the same time.

9. The method of claim 7, wherein the polyol and the first, the second, the third and the fourth blowing agents are injected into the mixing chamber in a liquid phase.

10. The method of claim 7, wherein each stream of polyol and the first, the second, the third, and the fourth blowing agent is continuously injected into the mixing chamber.

11. The method of claim 7, further comprising: delivering the discharged mixture from the mixing chamber to a static mixer; and mixing the discharged mixture in the static mixer.

12. The method of claim 7, further comprising: adding an isocyanate to the discharged mixture to form polyurethane foam.

13. The method of claim 7, wherein about 1 to about 15 parts of each of the blowing agents are mixed with about 100 parts of the polyol.

14. The method of claim 7, wherein the minimum flow rate of the injected polyol is about 200 gram/second.

15. The method of claim 14, wherein the minimum flow rate of each of the injected blowing agents is about 2 gram/second.

* * * * *